United States Patent
Brasher et al.

(10) Patent No.: US 10,909,248 B2
(45) Date of Patent: Feb. 2, 2021

(54) EXECUTING ENCRYPTED BOOT LOADERS

(71) Applicant: MICROSOFT TECHNOLOGY LICENSING, LLC, Redmond, WA (US)

(72) Inventors: Michael Eugene Brasher, Austin, TX (US); Nicholas Harvey Meier, Windsor, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 15/636,675

(22) Filed: Jun. 29, 2017

(65) Prior Publication Data
US 2019/0005244 A1    Jan. 3, 2019

(51) Int. Cl.
G06F 21/57 (2013.01)
H04L 9/08 (2006.01)
H04L 9/32 (2006.01)
G06F 12/14 (2006.01)

(52) U.S. Cl.
CPC .......... *G06F 21/575* (2013.01); *G06F 12/145* (2013.01); *G06F 12/1408* (2013.01); *H04L 9/0877* (2013.01); *H04L 9/0897* (2013.01); *H04L 9/3234* (2013.01); *H04L 9/3263* (2013.01); *G06F 2212/1052* (2013.01)

(58) Field of Classification Search
CPC ........ G06F 21/57; G06F 21/575; G06F 12/14; G06F 12/1408; G06F 12/145; H04L 9/0861; H04L 9/0877; H04L 9/3234; H04L 9/3263; H04L 9/0897
See application file for complete search history.

(56) References Cited

U.S. PATENT DOCUMENTS 9,171,170 B2    10/2015 Dellow et al.
9,230,112 B1*    1/2016 Peterson ............... G06F 21/575
9,325,506 B2    4/2016 Jones et al.
(Continued)

FOREIGN PATENT DOCUMENTS

WO    2015116204 A1    8/2015
WO    2016107749 A1    7/2016
WO    2016131553 A1    8/2016

OTHER PUBLICATIONS

Bees, et al., "Security Guidance for Critical Areas of Embedded Computing", https://prplworks.files.wordpress.com/2016/01/prpl-security-guidance-for-critical-areas-of-embedded-computing-2-5-2.pdf, Published on: Jan. 2016, 58 pages.
(Continued)

*Primary Examiner* — Jung W Kim
*Assistant Examiner* — Adrian Stoica
(74) *Attorney, Agent, or Firm* — Rainier Patents, P.S.

(57) ABSTRACT

A secure boot mechanism is described. The secure boot mechanism can operate in environments not originally designed to support such a mechanism. Downstream boot components can be executed from an encrypted boot partition. A first stage boot loader (FSBL) can load a second stage boot loader (SSBL) from an encrypted disk partition. The FSBL can decrypt and load the SSBL. The FSBL can intercept all I/O initiated by the SSBL so that the SSBL can transparently operate on an encrypted disk partition as though the encrypted disk were unencrypted.

20 Claims, 4 Drawing Sheets

(56) References Cited

U.S. PATENT DOCUMENTS

| | | | |
|---|---|---|---|
| 2009/0327741 A1* | 12/2009 | Zimmer | G06F 21/575 |
| | | | 713/183 |
| 2010/0131694 A1 | 5/2010 | Kelly et al. | |
| 2011/0277013 A1* | 11/2011 | Chinta | G06F 21/6218 |
| | | | 726/1 |
| 2014/0189340 A1* | 7/2014 | Hadley | G06F 21/54 |
| | | | 713/2 |
| 2014/0359302 A1* | 12/2014 | Joshi | G06F 12/1408 |
| | | | 713/189 |
| 2018/0004954 A1* | 1/2018 | Liguori | H04L 9/3263 |
| 2018/0034793 A1* | 2/2018 | Kibalo | G06F 21/575 |
| 2019/0058588 A1* | 2/2019 | Chen | G06F 12/1408 |

OTHER PUBLICATIONS

Sironi, et al., "Capturing Information Flows inside Android and Qemu Environments", In Journal of the Computing Research Repository, Feb. 12, 2013, pp. 1-13.

"SDB:Basics of partitions, filesystems, mount points", https://en.opensuse.org/SDB:Basics_of_partitions,_filesystems,_mount_points, Retrieved on: May 11, 2017, 13 pages.

* cited by examiner

EXECUTING ENCRYPTED BOOT LOADERS

BACKGROUND

Computer security (cyber security), the protection of physical and electronic computing resources, is becoming of more and more concern every day. While most electronic devices have at least some rudimentary protection, all or almost all devices have vulnerabilities. The field is of growing importance due to the ubiquitous nature of computers. One point of vulnerability is along the boot chain.

In computing, booting (or booting up) refers to initialization of a computing device. A boot loader is a program that typically performs a power-on self-test, locates and initializes peripheral devices and loads and starts an operating system. Firmware loads the primary boot loader into main memory from non-volatile memory devices such as ROM, EPROM, flash memory or from persistent storage (e.g., from disk, etc.). A first stage boot loader may invoke a second stage boot loader, the second stage boot loader may invoke a third stage boot loader and so on in a chain.

SUMMARY

A secure boot mechanism is described. The secure boot mechanism can operate in environments not originally designed to support such a mechanism. Downstream boot components can be executed from an encrypted boot partition. A first stage boot loader (FSBL) can load a second stage boot loader (SSBL) or other downstream boot loader from an encrypted persistent storage device (e.g., such as from an encrypted disk partition). The FSBL can intercept all I/O initiated by the SSBL or other downstream boot loader so that the SSBL or other downstream boot loader can transparently operate on an encrypted partition as though the encrypted storage device were unencrypted.

Key files for the encrypted partitions can be decrypted and stored in memory. The decrypted key files can be injected into an in-memory block cache. Additional security can be provided by not persisting (e.g., not storing in persistent (non-memory) storage) the decrypted key files. The decrypted key files can be used to decrypt the encrypted partitions of the persistent storage (e.g., disk), enabling an operating system to be booted from an encrypted boot partition non-intrusively, without modifying components along the boot chain. The secure boot mechanism can operate in environments not originally designed to support such a mechanism.

Downstream boot components (second stage boot loader, third stage boot loader, etc.) can execute in an encrypted environment that is not inherently supported by the boot components. The number of programs that need access to a cryptographic security device (e.g., a TPM (Trusted Platform Module) chip) to decrypt the cryptographic keys can be limited to the primary boot loader (the FSBL), and can permit the keys to be injected into the memory blocks used to decrypt the encrypted partitions, without persistently exposing those keys by only retaining the decrypted keys in memory and not writing the decrypted keys out to persistent (non-memory) storage such as disk, etc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
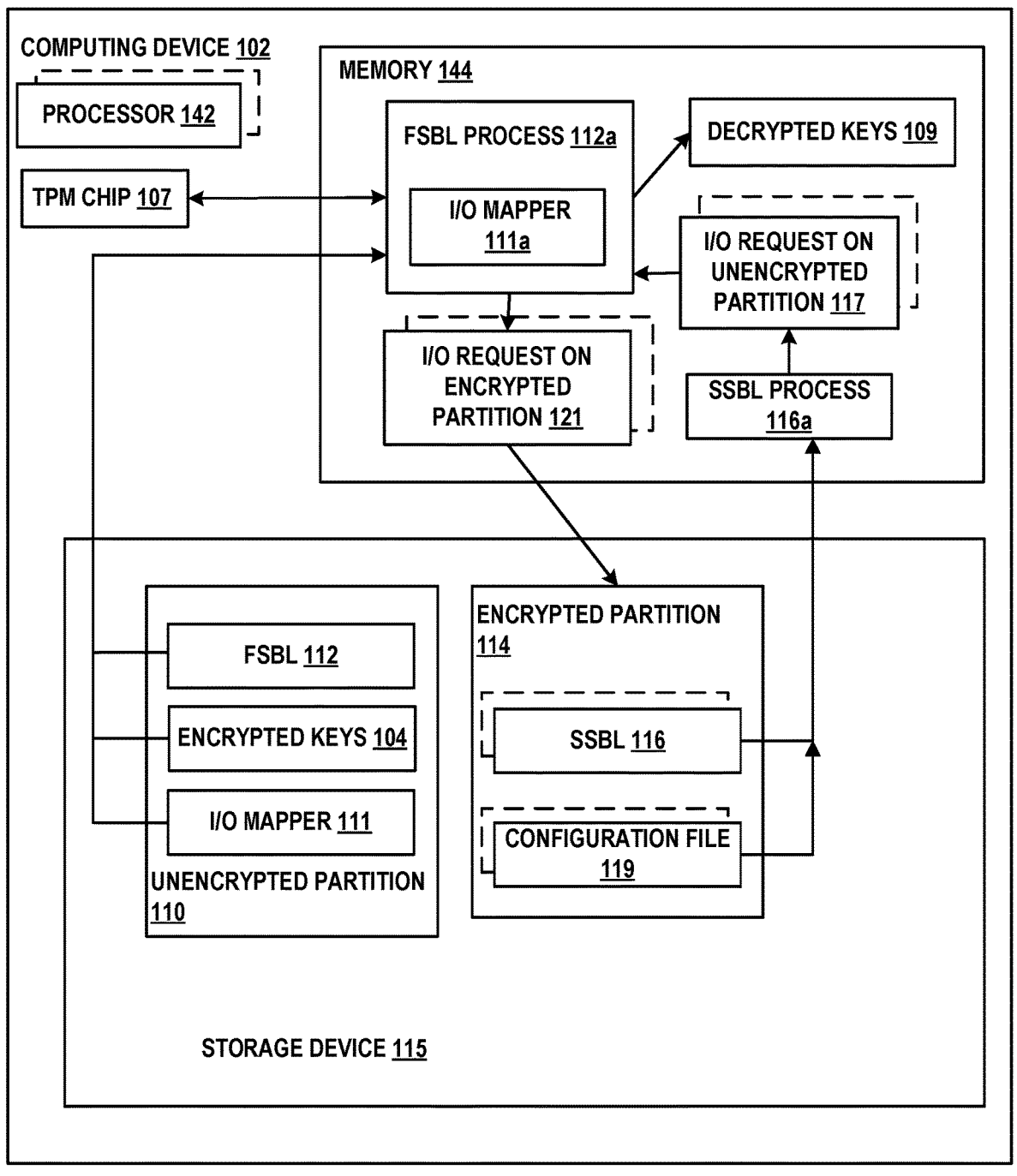
FIG. 1 is a block diagram 100 representing an example of a system for executing encrypted boot loaders in accordance with aspects of the subject matter described herein.

In one typical approach that attempts to make the boot process more secure, firmware of the device being booted has a certificate or key that is used to verify that a boot loader was digitally signed by some trusted organization. The verified boot loader may load the next stage in the boot process and verify it and so on. This approach is vulnerable to attack by replacement of programs along the boot chain. An attacker with physical access to a computer can retrieve encryption keys from a running operating system after using a cold reboot to restart the machine because memory contents remain readable for a short time after powering off. Attempts to solve the problem by adhering to the TPM standards for a secure crypto-processor can also be circumvented. A crypto-processor is a microcontroller designed to secure hardware by integrating cryptographic keys into devices. Each TPM chip has a unique, secret RSA (Rivest-Shamir-Adleman) cryptosystem key burned into it. A software application that obtains the key from TPM can use the key to perform encryption and/or decryption operations. Moreover, such an approach increases vulnerability by allowing downstream components to unseal secrets using the TPM.

In accordance with aspects of the subject matter disclosed herein, the primary boot loader resides on an unencrypted partition. The authenticity of the boot loader can be verified (e.g., by UEFI) via certificates. Subsequent components can reside on an encrypted partition. Because the boot components reside on an encrypted partition, they cannot be replaced. Only the first stage boot loader has access to the cryptographic security device. The first stage boot loader can capture the I/O requests from downstream boot software such as for example, from the second stage boot loader, third stage boot loader, etc.

Encrypted keys can be decrypted using a security mechanism such as but not limited to the TPM chip. The decrypted keys can be used to access the encrypted partitions transparently. A new FSBL can be inserted before the existing primary boot loader enabling the mechanism to work without making any changes to existing boot software. The existing boot software is unaware that it is running on an encrypted partition. Requests made from the existing boot software to an unencrypted partition can be redirected to the encrypted partition by replacing the content of the functions called by the boot software to redirect the call to an I/O mapper. The I/O can be virtualized at the existing boot software stages.

In accordance with aspects of the subject matter disclosed herein, the partition on which the pre-existing boot software resides can be encrypted. The key that decrypts the partition can be stored on another (unencrypted partition). In accordance with some aspects of the subject matter disclosed herein, the key can be stored in a TPM-sealed file stored on an unencrypted partition. The firmware interface can be initialized. The added first stage boot loader can be accessed on the unencrypted partition. The interface can search for the certificate that was used to digitally sign the primary boot loader. In accordance with some aspects of the subject matter disclosed herein, the certificate can be obtained from the UEFI firmware. If the certificate for the primary boot loader is trusted, the bootloader can be run. The primary bootloader can unseal (decrypt) the keys used to decrypt the encrypted partitions. The keys can be loaded from a TPM-sealed (TPM-encrypted) file stored on the unencrypted partition. In accordance with some aspects of the subject matter described herein, only the TPM chip on that machine is able to unseal that file and thus obtain the keys.

It can load the old primary bootloader on an encrypted partition and can set up the I/O indirection by replacing the content of the function tables called by the existing boot software to access the encrypted partition. The existing boot software runs but requests can be redirected to the encrypted partition. The existing software looks for its configuration file on a drive which appears to the software to be unencrypted but the calls are redirected to the encrypted drive. The unencrypted partition may actually only reside in memory. The configuration file can be loaded from the encrypted partition and the boot proceeds. Some configuration values can be modified on the fly. The decrypted decryption keys can be injected into memory (e.g., cache) to eliminate exposure of the keys.

In essence, an existing secure boot mechanism is used to load the primary boot loader but the security of all the downstream software depends on encryption instead of using trusted certificates and digital signing. Thus, the decryption keys which have been unsealed by the cryptographic security device (e.g., the TPM chip) are securely transmitted to plain disk files in the memory-mapped copy of the initial partition. The in-memory partition that the boot loader sets up to mediate I/O requests from subsequent boot components, presents a virtual, unencrypted disk partition that enables a mapping to a physical encrypted disk partition.

Executing Encrypted Boot Loaders

FIG. 1 is a block diagram representing a system 100 for executing encrypted boot loaders in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, servers, virtual machines, devices including databases, firewalls and so on. A computing device such as computing device 102 can include one or more processors such as processor 142, etc., and a memory such as memory 144 that communicates with the one or more processors.

System 100 may include any one of or any combination of: one or more persistent non-memory storage devices such as storage device 115. Storage device 115 may include one or more encrypted and/or unencrypted partitions such as unencrypted partition 110 and/or encrypted partition 114. A primary or first stage bootloader (FSBL 112), encrypted keys 104 and/or an I/O mapper such as I/O mapper 111 may reside on unencrypted partition 110. An encrypted partition such as encrypted partition 114 may include downstream bootloaders including at least a second stage bootloader such as second stage bootloader (SSBL) 116, etc. and one or more configuration files for the bootloaders such as configuration file 119, etc. associated with the downstream bootloaders. System 100 may include a cryptographic security device such as but not limited to a TPM chip such as TPM chip 107.

System 100 may include one or more program modules such as FSBL 112, and/or IO mapper 111 which when loaded into the memory and accessed by the one or more processor configure the processor to perform the actions attributed to the program modules. FSBL 112 can decrypt encrypted keys 104 to create decrypted keys 109, load decrypted keys 109 into memory (e.g., into a block of cache memory), decrypt downstream boot loaders such as SSBL 116, etc. and load the decrypted downstream bootloaders such as but not limited to SSBL 116, etc. into a process in memory. FSBL 112 can intercept I/O requests made by the downstream bootloader such as SSBL 116, etc. and send the intercepted request to I/O mapper 111. I/O mapper 111 can redirect the intercepted requests made from the existing boot software to an unencrypted partition to the encrypted partition 114 by redirecting the call to an unencrypted partition to an encrypted partition. I/O mapper 111 can map an encrypted partition onto an unencrypted partition in memory. In accordance with some aspects of the subject matter disclosed herein, this can be implemented by changing the content but not the name of one or more functions called by the original boot software.

In operation, FSBL 112 can be loaded into a process in memory such as FSBL process 112a. FSBL process 112a can access a cryptographic security device such as but not limited to TPM chip 107 to decrypt encrypted keys 104 to create decrypted keys 109 which can be stored in memory 144. Decrypted keys 109 can be stored in cache memory. FSBL process 112a may decrypt downstream boot loaders including but not limited to SSBL 116. For example, when SSBL 116 in process SSBL 116a executes, it may generate an I/O request on an unencrypted partition 117. FSBL process 112a may intercept the I/O request on an unencrypted partition 117 and can send the intercepted request to executing I/O mapper 111a. Executing I/O mapper 111a can redirect the request by creating an I/O request on an encrypted partition such as I/O request on encrypted partition 121.

The first stage boot loader process (FSBL process 112a) can decrypt and load a downstream boot loader such as but not limited to second stage boot loader (SSBL 116) from unencrypted disk partition 110. The FSBL process 112a can intercept all I/O initiated by the SSBL process 116a so that the SSBL can transparently operate on an encrypted disk partition as though the encrypted disk were unencrypted.

When the FSBL process 112*a* executes, it can inject key files of the encrypted partition into an in-memory block cache. In accordance with some aspects of the subject matter disclosed herein, the blocks holding the key files are not copied to disk or otherwise persisted. The key files can be used to decrypt the encrypted partitions of the disk, enabling an operating system to be booted from an encrypted boot partition non-intrusively, without modifying components along the boot chain. The secure boot mechanism can operate in environments not originally designed to support such a mechanism.

Downstream boot components can execute in an encrypted environment that is not inherently supported by the boot components. It can limit the need for access to the cryptographic security device (e.g., TPM 107) to decrypt the keys, and can permit the keys to be injected into the memory blocks used to decrypt the partitions, without persistently exposing those keys.

Figure 2A:
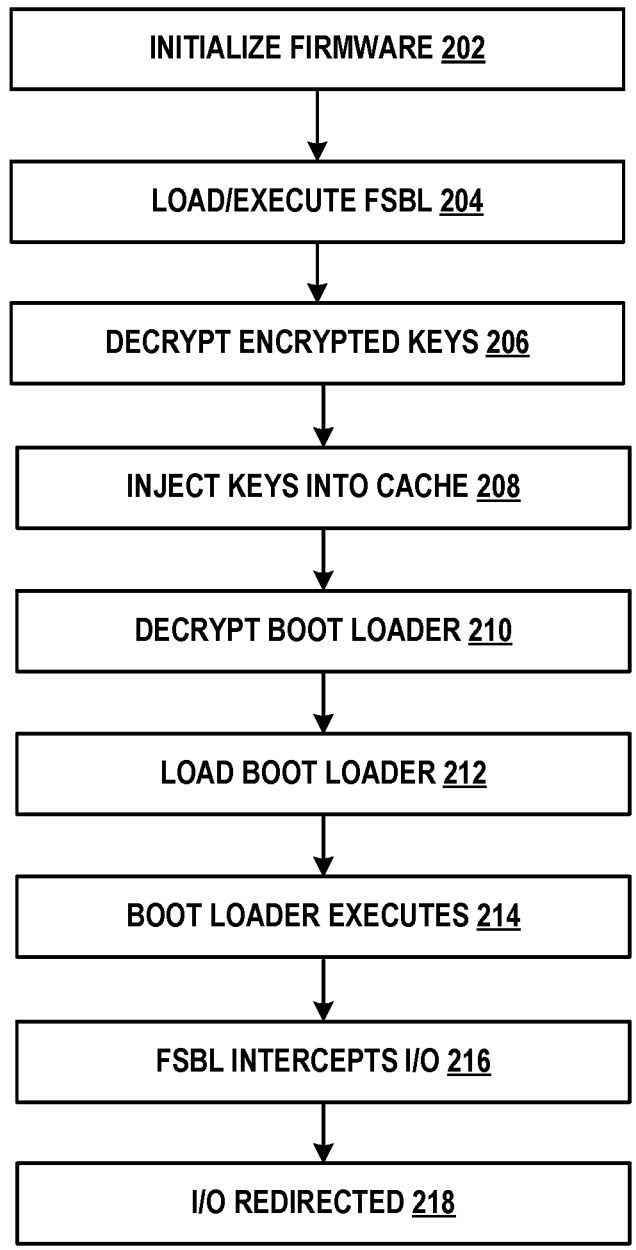
FIG. 2a illustrates an example 200 of a method for executing encrypted boot loaders in accordance with aspects of the subject matter described herein.

FIG. 2*a* illustrates an example of a method 200 for executing encrypted boot loaders in accordance with aspects of the subject matter described herein. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed. In some instances, not all operations performed are illustrated. Method 200 or portions thereof may be executed by a system or a portion of a system such as system 100.

At operation 202 a firmware interface can be initialized. At operation 204 the firmware interface can load and execute a first stage boot loader (FSBL). At operation 206 the FSBL can unseal the disk partition keys for encrypted partitions of the disk. At operation 208 the FSBL can inject key files of the encrypted partitions into an in-memory block cache. In accordance with some aspects of the subject matter disclosed herein, the in memory block cache is not copied to disk. At operation 210 the FSBL can decrypt a downstream boot loader (e.g., in a boot loader chain). At operation 212 the FSBL can load the decrypted downstream boot loader into a process. At operation 214 the bootloader can execute. Any additional downstream boot components in the bootloader chain can be decrypted and loaded into a process and executed. The key files can be used to unlock the encrypted partitions of the disk. At operation 216 the FSBL can intercept all I/O initiated by the downstream boot loader. At operation 218 the intercepted I/O can be redirected so that the downstream boot loader can transparently operate on an encrypted disk partition as though the encrypted disk were unencrypted.

Figure 2B:
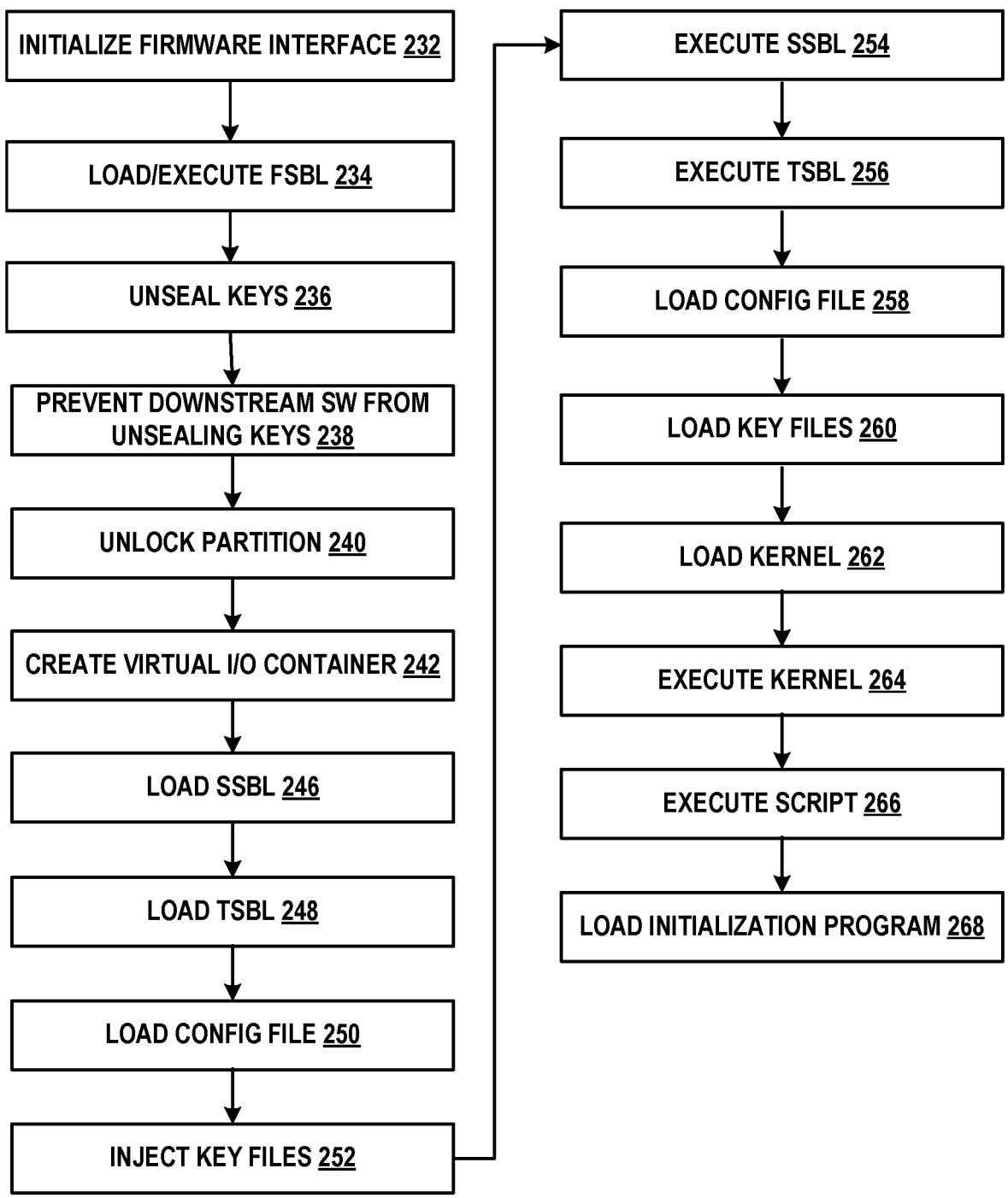
FIG. 2b illustrates an example 220 of another method for executing encrypted boot loaders in accordance with aspects of the subject matter described herein.

FIG. 2*b* illustrates an example of a method 220 for executing encrypted boot loaders in accordance with aspects of the subject matter described herein. While method 220 describes a series of operations that are performed in a sequence, it is to be understood that method 220 is not limited by the order of the sequence depicted. For instance, some operations may occur in a different order than that described. In addition, one operation may occur concurrently with another operation. In some instances, not all operations described are performed. In some instances, not all operations performed are illustrated. Method 220 or portions thereof may be executed by a system or a portion of a system such as system 100.

At operation 232 an interface between the firmware and the operating system of the computer can be initialized. The interface may be a Unified Extensible Firmware Interface (UEFI). An EFI System partition (ESP) may be created, which can include UEFI applications such as bootloaders, operating system kernels, and utility software. At operation 234 the firmware interface can load and execute the primary or first stage boot loader. The boot loader may be loaded from an unencrypted partition. The unencrypted partition can be the EFI system partition (ESP). At operation 236 the primary boot loader TPM can unseal the disk partition keys for the encrypted partitions of the disk. The disk partition keys may reside on an unencrypted disk partition such as but not limited to the ESP. At operation 238 the primary boot loader may prevent downstream components such as but not limited to a second stage boot loader, etc., from unsealing the keys. The primary boot loader can prevent downstream components from unsealing the keys.

At operation 240 the primary boot loader can use the boot key to unlock the boot partition. At operation 242 the primary boot loader can create a virtual I/O container. A virtual I/O container can be a memory-mapped unencrypted in-memory partition that maps onto the encrypted boot partition. At operation 246 the primary boot loader can preload a second stage boot loader (e.g., Linux shim) from the encrypted boot partition. At operation 248 the primary boot loader can preload a third stage boot loader (TSBL) (e.g., GRUB2) from the encrypted boot partition (into the in-memory partition).

At operation 250 a configuration file for the third stage boot loader can be preloaded into the in-memory partition by the primary boot loader. At operation 252 the primary boot loader can inject the disk key files into the [Linux initial ramdisk] on the in-memory partition. In accordance with some aspects of the subject matter described herein, the disk key files are not modified or copied to disk. At operation 254 the primary boot loader can execute the second stage boot loader (e.g., Linux shim).

At operation 256 the second stage boot loader (e.g., Linux shim) can load the third stage boot loader (e.g., GRUB2) from the in-memory partition. At operation 258 the third stage boot loader (e.g., GRUB2) can load its configuration file from the in-memory partition. At operation 260 the third stage boot loader (e.g., GRUB2) can load the key files (e.g., Linux initial ramdisk) from the in-memory partition. At operation 262 the third stage boot loader can load the operating system kernel (e.g., the Linux kernel from the in-memory partition. At operation 264 the third stage boot loader (e.g., GRUB2) can execute the kernel to boot into the in-memory partition (e.g., the initial ramdisk). At operation 266 a script that unlocks the encrypted disk partitions can be executed in the in-memory partition (e.g., the initial ramdisk). At operation 268 the initialization program (e.g., Linux init) can be loaded and booting can proceed as known in the art.

In accordance with some aspects of the subject matter disclosed herein, Linux VMs can be shielded from attack while at rest and while running under Hyper-V. The subject matter disclosed herein builds on three mechanisms provided by Hyper-V: (1) A shielded mode that a VM may run in, protecting all VM resources such as memory, swap files, configuration files, etc. (2) UEFI secure boot, in which UEFI validates the certificate of the first stage boot loader, and (3) A virtual TPM 2.0 implementation, which is used to unseal secrets. The techniques disclosed herein can be applied to bare metal or to other hypervisors, not limited to Hyper-V.

Pre-templatization, templatization, provisioning, and specialization are performed to prepare a Linux machine to run under Hyper-V. Pre-templatization is the process of taking a Linux virtual hard disk and encrypting the disk partitions with a well-known key, installing the signed boot loader described above, and making certain configuration changes. Templatization is the process of installing a provisioning boot loader, computing hashes of the disk partitions, and publishing the template in a gallery. Provisioning is the process of choosing a template from the gallery, booting into that template (via the provisioning boot loader), verifying the disk hashes, verifying the boot loader, re-encrypting the disks partitions with new keys, TPM-sealing the new keys and writing them to the EFI system partition, and then restoring the special boot loader. Specialization begins the first time the provisioned VM is booted, which applies certain configuration changes to the freshly-provisioned VM. After these transformations have been applied, the system is ready for production.

Example of a Suitable Computing Environment

Figure 3:
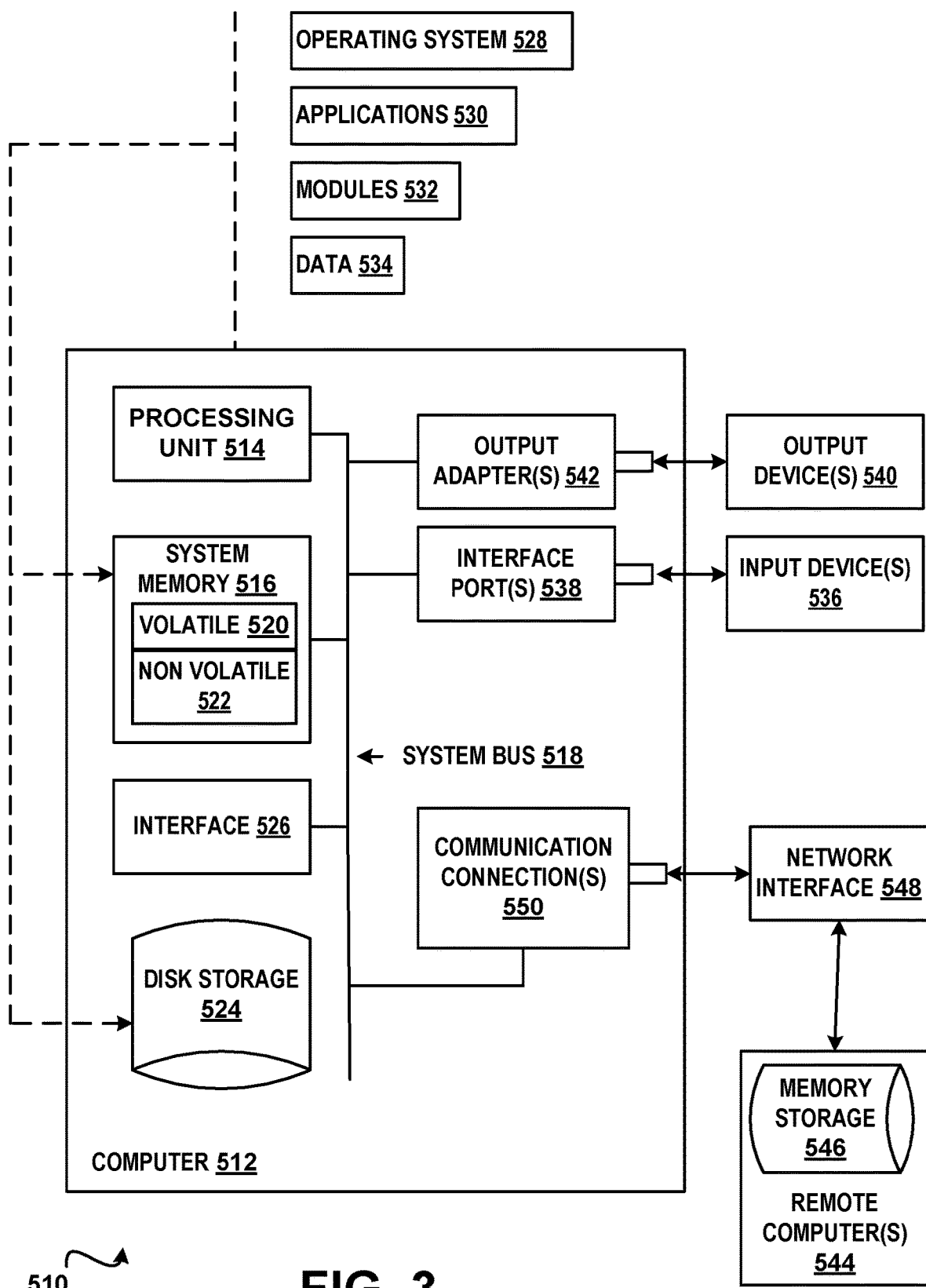
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device comprising:
a cryptographic security device; a storage device; at least one processor; and a memory connected to the at least one processor; the at least one processor configured to:
load a first stage boot loader (FSBL) from an unencrypted partition on the storage device;
check a certificate associated with the FSBL;
in response to determining that the certificate is from a trusted source, execute the FSBL;
by the FSBL, unseal an encrypted key using the cryptographic security device to obtain a decryption key that is operable to decrypt an encrypted partition on the storage device;
by the FSBL, decrypt boot software residing on the encrypted partition to obtain decrypted boot software that executes in the memory;
by the FSBL, intercept an I/O request from the decrypted boot software; and
by an I/O mapper, redirect the intercepted I/O request from the decrypted boot software to the encrypted partition so that the decrypted boot software operates on the encrypted partition as though the encrypted partition were unencrypted,
wherein the decrypted boot software is prevented from unsealing the encrypted key with the cryptographic security device.

2. The computing device of claim 1, wherein the at least one processor is configured to:
by the FSBL, inject the decryption key into a memory cache on the memory.

3. The computing device of claim 2, wherein the at least one processor is configured to:
by the FSBL, decrypt the encrypted partition with the decryption key.

4. The computing device of claim 2, wherein the at least one processor is configured to:
access the encrypted key in a sealed file sealed by the cryptographic security device; and
unseal the sealed file using the cryptographic security device.

5. The computing device of claim 2, wherein the FSBL does not persist the decryption key to the storage device.

6. The computing device of claim 1, wherein the at least one processor is configured to:
present the encrypted partition to the decrypted boot software as a virtual unencrypted partition that resides only in memory and is mapped, by the FSBL, to the encrypted partition on the storage device.

7. The computing device of claim 6, wherein the at least one processor is configured to:
map multiple I/O requests from the decrypted boot software to the virtual unencrypted partition to corresponding locations on the encrypted partition.

8. The computing device of claim 1, wherein the decrypted boot software is allowed to execute without verification via a trusted certificate and without verification via digital signature.

9. The computing device of claim 1, wherein the decrypted boot software comprises a second stage boot loader.

10. The computing device of claim 9, wherein the second stage boot loader comprises a shim for a particular operating system.

11. A method of executing a boot chain, the method comprising:
loading a first stage boot loader (FSBL) from an unencrypted partition on a storage device having encrypted boot software stored on an encrypted partition;
checking a certificate associated with the FSBL;
in response to determining that the certificate is from a trusted source, executing the FSBL;

by the FSBL, unsealing a sealed file on the unencrypted partition to obtain a decryption key, wherein the sealed file was previously sealed by a cryptographic security device;

by the FSBL, using the decryption key to decrypt the encrypted boot software residing on the encrypted partition to obtain decrypted boot software that is loaded into memory;

by the FSBL, presenting a virtual unencrypted partition that resides in memory to the decrypted boot software by:
   intercepting an I/O request from the decrypted boot software to the virtual unencrypted partition; and
   using an I/O mapper to map the intercepted I/O request from the decrypted boot software to the encrypted partition; and preventing the decrypted boot software from using the cryptographic security device to unseal the sealed file.

12. The method of claim 11, further comprising:
mapping the virtual unencrypted partition residing in memory onto the encrypted partition residing on the storage device.

13. The method of claim 12, wherein the cryptographic security device comprises a trusted platform module.

14. The method of claim 13, further comprising:
injecting the decryption key into a memory cache on the memory, wherein the decryption key is not persisted to the storage device.

15. A machine-readable medium storing computer-readable instructions that, when executed, cause a computing device to:
load a first stage boot loader (FSBL) from a physical unencrypted partition on a storage device having boot software stored on a physical encrypted partition;
check a certificate associated with the FSBL;
in response to determining that the certificate is from a trusted source, execute the FSBL;
by the FSBL, use a cryptographic security device to unseal a decryption key that is operable to decrypt the boot software on the physical encrypted partition on the storage device;
by the FSBL, decrypt the boot software stored on the physical encrypted partition to obtain decrypted boot software and present a virtual unencrypted partition in memory to the decrypted boot software;
by the FSBL, intercept an I/O request to the virtual unencrypted partition from the decrypted boot software; and
by an I/O mapper, redirect the intercepted I/O request to the physical encrypted partition,
wherein the virtual unencrypted partition allows the decrypted boot software to operate on the physical encrypted partition as though the physical encrypted partition were unencrypted, and
wherein the decrypted boot software is prevented from using the cryptographic security device to unseal the decryption key.

16. The machine-readable medium of claim 15, storing further computer-readable instructions that, when executed, cause the computing device to:
redirect the intercepted I/O request by changing content of a function called by the decrypted boot software.

17. The machine-readable medium of claim 15, storing further computer-readable instructions that, when executed, cause the computing device to:
by the FSBL, inject the decryption key into memory.

18. The machine-readable medium of claim 17, storing further computer-readable instructions that, when executed, cause the computing device to:
prevent the decryption key from being persisted.

19. The machine-readable medium of claim 15, storing further computer-readable instructions that, when executed, cause the computing device to:
allow the decrypted boot software to execute without verification by trusted certificate and without verification via digital signature.

20. The machine-readable medium of claim 19, wherein the cryptographic security device comprises a trusted platform module.

* * * * *